Figure 1:
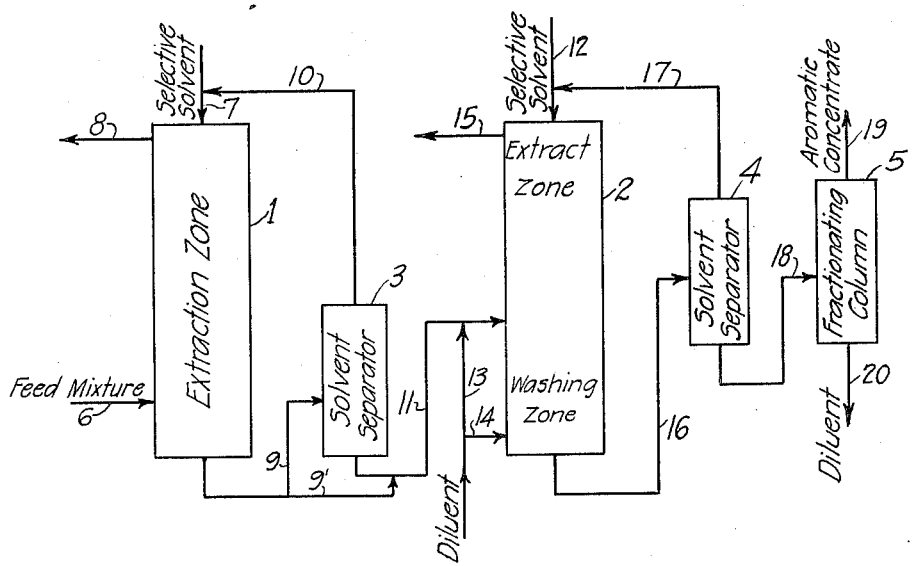

April 19, 1938. H. EGLI 2,114,524

EXTRACTION PROCESS

Filed Oct. 27, 1934

Inventor: Heinrich Egli
By his Attorney:

Patented Apr. 19, 1938

2,114,524

UNITED STATES PATENT OFFICE 2,114,524

EXTRACTION PROCESS

Heinrich Egli, Emmastad, Curacao, Dutch West Indies, assignor to Shell Development Company, San Francisco, Calif., a corporation of Delaware Application October 27, 1934, Serial No. 750,319
In the Netherlands November 16, 1933

4 Claims. (Cl. 196—13)

This invention relates to extraction processes and constitutes an improvement thereof for producing concentrates of that component of the mixture being extracted which is preferentially soluble in the selective solvent used. More particularly it pertains to a process for producing hydrocarbon mixtures rich in aromatics.

One of the specific objects of this invention is to produce light aromatic concentrates suitable as aviation fuels, aromatic solvents, as for use in the lacquer industry, etc., from aromatic extracts obtained by solvent extraction methods. Other objects will be apparent from the following description of the principles underlying the invention and the manner in which it can be practised when treating, for example, various hydrocarbon mixtures.

The material to be treated may be either a mineral oil distillate, or a residue, or any other mixture of hydrocarbons which are responsive to solvent extraction treatment. However, the process of this invention is particularly suited for concentrating extracts obtained by a previous extraction treatment.

According to the invention, such an extract is mixed with a non-aromatic (paraffinic) diluent and the mixture is extracted with a selective solvent. The material used as diluent must possess properties permitting its separation from the material being treated, e. g. by distillation. The mixed extract phase obtained by extraction in the presence of the said diluent is then treated to separate the solvent and diluent from the aromatic concentrate of the original material.

One of the important advantages of this process is that it becomes possible to concentrate an extract while employing the same solvent and substantially the same operating conditions, such as pressure, temperature, concentrations, etc., as those used in the process of making the said extract. In fact, an extract can be concentrated by the method of this invention under extracting conditions which are less intense than those employed for producing the original extract, i. e. either the same or even a higher temperature and/or less solvent or solvent mixture may be used in this new process, than those employed for producing the original extract.

In general, these extracting conditions may be varied depending on the desired degree of concentration to be obtained. It can be shown, however, that the following equation, which is based on certain practically reasonable assumptions, must be satisfied by adjusting said extracting conditions, in order to effect the concentration of the original extract by the method of this invention:

$$n > a + \frac{m(p-a)}{k+m}$$

where $n$ is the volume concentration of total aromatics in the mixed extract, $a$ and $p$ are the volume concentrations of aromatics in the original extract and in the diluent, respectively; and $k$ and $m$ are the volumes of the original extract and the diluent respectively. This equation is applicable wherever the combined original extract and diluent are subjected to a solvent extraction treatment, either batch or continuous.

The use of the equation may be illustrated by the numerical example:

It is desired to increase the aromatic content of a low boiling aromatic extract containing 60% aromatics and 40% non-aromatics. To 100 parts of this extract are added 100 parts of a high boiling diluent low in aromatics, such as containing 20% aromatics and 80% non-aromatics. The mixture is extracted with a selective solvent, mixed extract being thus obtained in which the volume ratio of total aromatics to non-aromatics may be represented as $n$ to $1-n$. The high-boiling part of the extract and the solvent are subsequently separated by distillation from the low boiling part.

In accordance with the above mentioned equation:

$$n > 60 + \frac{100(20-60)}{100+100} \text{ or } n > 40\%$$

which means that in order to obtain a low boiling extract containing over 60% aromatics, the extraction of the extract-diluent mixture must be conducted in such a manner that the total aromatic content in the resulting mixed extract is over 40%.

Figure 2:
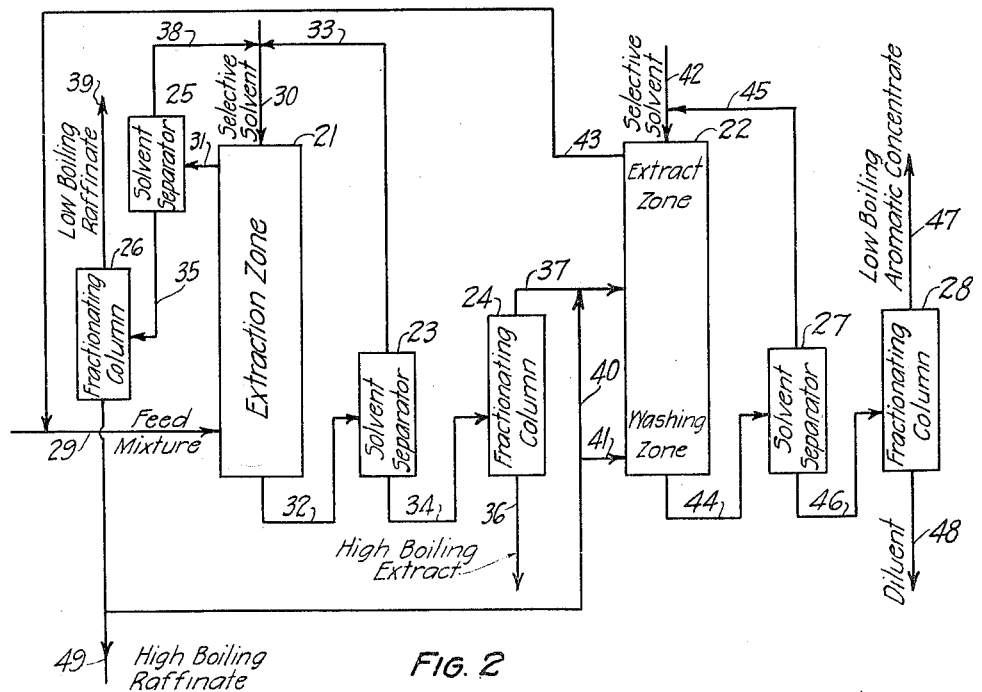

For the purpose of further illustrating this invention, flow diagrams of two methods of operation are represented in the accompanying drawing, of which Fig. 1 shows one method of concentrating an extract in accordance with the method of this invention, while Fig. 2 shows a more specific application of the new method.

In Fig. 1, reference characters 1 and 2 represent two extraction apparatus, and 3, 4, and 5 are three separating apparatus, such as fractionating columns, all interconnected by pipe lines, as shown on the drawing and hereinafter described, and equipped with necessary valves, pumps, heaters, heat exchangers, and other auxiliary equipment, not shown.

In operation, a hydrocarbon oil, such, for example, as a gasoline distillate, is introduced through pipe 6 into the apparatus 1 and is extracted (preferably, countercurrently) with a selective solvent introduced into the apparatus through a pipe 7. Under extracting conditions prevailing within the apparatus two phases are formed, one of which, the raffinate phase, is withdrawn through a pipe 8, and the other, the extract phase, through a pipe 9. The raffinate phase may be disposed of in any desired manner, while the extract phase is conducted to the apparatus 3, where it is separated into extract and solvent portions. The solvent may be returned to the pipe 7 by means of a conduit 10, and the extract is conducted by means of a pipe 11 to the extraction apparatus 2. A portion of the extract phase from 9 may be conducted directly to the pipe 11 through a by-pass 9', whereby the composition of material introduced into the apparatus 2 can be regulated. The material entering 2 from the pipe 11 is subjected to extraction with a selective solvent, introduced by means of a pipe 12, in the presence of a non-aromatic diluent or a diluent low in aromatics, such as kerosene or lubricating oil, introduced by means of pipe 13 and/or pipe 14. The pipe 13 may conduct the diluent either into the pipe 11 where the extract is commingled with the diluent, or it may introduce the diluent directly into the apparatus 2 near the entrance of the extract from the pipe 11. The pipe 14 is shown introducing the diluent into the apparatus 2 separately from the extract and at an effective distance from its entrance into the apparatus 2 and not far from the discharge point of the mixed extract phase, thus providing a washing zone. This last arrangement will generally cause a more favourable distribution in the extract phase between the component of the feed mixture and of the diluent, so that a gasoline of greater aromatic content will be produced.

A mixed raffinate phase (consisting of gasoline and diluent components and the solvent) forms and separates within the apparatus 2 and is withdrawn through a pipe 15, while a mixed extract phase is withdrawn through a conduit 16. The withdrawn mixed extract phase is introduced into the column 4, where the solvent is separated from the mixed extract; the solvent may be conducted by a pipe 17 to the pipe 12, while the mixed extract is transferred by a pipe 18 to the fractionating column 5, where its gasoline components are separated by distillation from the diluent components; the separated materials are withdrawn from 5 by means of conduits 19 and 20 respectively.

As a result of the above described treatment, the gasoline extract obtained by extraction with a selective solvent, as in the apparatus 1, is further concentrated by extraction in the presence of a non-aromatic diluent, i. e. the concentration of aromatics in it is increased, the concentrated product flowing through the conduit 19.

Although, as has been stated, a relatively non-aromatic diluent should be used for concentrating aromatics in the materials to be treated according to this invention, it becomes possible, when introducing the diluent as through the pipe 14, to employ diluents containing even somewhat higher concentrations of aromatics than the extract flowing through the pipe 11; but in any case, the aromatic concentration of the diluent should not exceed that of the solvent-free portion of the mixture within the apparatus 2 near the point of the entrance of the diluent.

To further illustrate my invention, the following example is presented:

A quantity of Edeleanu extract having a boiling range of 150° C. to 190° C. and containing 68.5% aromatics, was mixed with an equal quantity of Edeleanu refined kerosene having a boiling range of 216° C. to 308° C. and containing 10.0% aromatics, and the mixture extracted with liquid $SO_2$ to produce a new Edeleanu extract. After distillation of this new extract a distillate was obtained having approximately the same boiling range as the base extract, and an aromatic content of 87.6%. This product was very suitable for use as a component of aviation motor fuels.

The process illustrated by Fig. 2 consists of a combination of steps suitable for producing a low boiling aromatic concentrate from a long hydrocarbon oil distillate containing both low and high boiling aromatic and non-aromatic components.

In Figure 2, reference characters 21 and 22 represent two extraction apparatus, and 23, 24, 25, 26, 27 and 28 are six separating apparatus, such as fractionating columns, all interconnected by pipe lines, as shown in the drawing and hereinafter described, and equipped with the necessary valves, pumps, heaters, heat exchangers, and other auxiliary equipment not shown.

According to this embodiment of my invention, a long hydrocarbon oil distillate, i. e. one containing both low and high boiling components, such as a distillate having a boiling range from 150° C. to 300° C., is introduced through a pipe 29 into the apparatus 21, and extracted (preferably countercurrently) with a selective solvent introduced into the apparatus through a pipe 30, forming a raffinate phase, which is withdrawn through a pipe 31, and an extract phase, which is withdrawn through a pipe 32. The extract phase is conducted to the apparatus 23, where it is substantially freed of the solvent. The solvent may be returned to the pipe 30 by a conduit 33, and the extract is conducted by means of a pipe 34 to the apparatus 24, where it is separated into high and low boiling fractions, as, for example, into fractions boiling, respectively, above and below 190° C. The high boiling fraction from the apparatus 24 is withdrawn at 36 and disposed of in any desired manner, while the low boiling fraction is conducted by means of a pipe 37 to the extraction apparatus 22.

The raffinate phase from the apparatus 21 is conducted by a conduit 31 to the apparatus 25 where it is separated into raffinate and solvent portions and the latter may be returned to the pipe 30 by a conduit 38. The raffinate is transferred by a conduit 35 to the apparatus 26 where it is separated into high and low boiling fractions, as, for example, fractions boiling above and below 220° C. The low boiling fraction is withdrawn at 39 and disposed of in any desired manner, while a portion of the high boiling fraction is used as a diluent extracting the low-boiling portion of the extract in the apparatus 22, being introduced thereinto by means of a pipe 40 and/or pipe 41. The portion not used as a diluent is withdrawn at 49. In the apparatus 22 the extract entering through the pipe 37 is subjected to extraction with a selective solvent introduced by means of a pipe 42.

A mixed raffinate phase (consisting of low and high boiling components and the solvents) forms and separates within the apparatus 22, and is withdrawn through a pipe 43, and may be disposed of as desired. This raffinate phase may have a relatively high content of low boiling aromatics, which may be recovered by further extraction. For example, this raffinate phase, or its solvent-free portion, may be conducted by the pipe 43 to and mixed with the fresh distillate in pipe 29; or it may be extracted separately.

The mixed extract phase separated in the apparatus 22 is withdrawn through a conduit 44 and introduced into the separator 27 where the solvent is separated from the mixed solvent. The solvent may be conducted by the pipe 45 to the pipe 42, while the mixed extract is transferred by a pipe 46 to the fractionating column 28, where the low boiling components are separated by distillation from the high boiling diluent components. The separated materials are withdrawn from 28 by means of conduits 47 and 48 respectively.

As a result of the above described process the following products are obtained: a highly aromatic distillate boiling at about 150-190° C. (conduit 47), an aromatic extract boiling at about 190° C.-300° C. (conduit 36), a raffinate boiling at about 150° C.-220° C. (conduit 39), and a raffinate boiling at about 220° C.-300° C. (conduits 48 and 49).

My process may be applied to produce a high boiling product by extracting the high boiling fraction of the extract which leaves separator 24 in the presence of the low boiling fraction of the raffinate which leaves separator 26. It should, further, be noted that my invention is not limited to the specific boiling ranges given above, but may be used with a wide variety of mineral oil fractions.

Usually, when the same selective solvent is used in the apparatus 1 and 2 of Fig. 1 or in 21 and 22 of Fig. 2, the temperature of extraction in both apparatus is approximately the same, although a somewhat higher temperature may sometimes be used in the apparatus 2 and 22 than those used in 1 and 21 respectively.

According to both embodiments of my invention, for the same operating conditions, the greater the dilution ratio, the greater will be the aromatic content of the final product, provided that the diluent has a lower aromatic concentration than the feed mixture or the extract phase at the point at which it is introduced.

Numerous modifications may be made in my process without departing from the spirit and scope of my invention. The invention may be used as either a batch, or continuous process. Selective solvents, which can be used in this process for extracting hydrocarbon mixtures, such as mineral oils, are represented by substances, such as liquid sulphur dioxide, furfural, acetone, nitrobenzene, methyl formate, chlorex, phenols, dimethyl sulphate, dimethyl sulphite, isoquinoline, quinoline, "acid oil", their mixtures, etc. A large number of other solvents may be used in my process, and I do not limit myself to those enumerated.

The diluents used in this process usually are petroleum fractions which have a relatively low aromatic content and which are readily separable from the material being concentrated. Many spindle oils and kerosenes are suitable for this purpose. Many other petroleum fractions or synthetic hydrocarbons are, however, likewise suitable.

Furthermore, as stated hereinbefore, this invention can be used for concentrating extracts obtained from other liquid mixtures or solutions than hydrocarbon mixtures. Generally, the invention is applicable for concentrating extracts of any mixture of components A+B by means of a preferential solvent for A and in the presence of a separable diluent of the type B, i. e. a diluent having solvent characteristics of B but separable therefrom either by distillation or by precipitation or by some other method. By the term "component" is designated either of the two portions of any liquid mixture, which portions can either be separated from or concentrated into each other by extraction with a solvent or a solvent mixture. It will be evident that by the word "component" is meant not only one chemically pure substance, but that this word covers also a mixture of substances. A component is said to be pure if it does not contain any portion of a substance which should be present only in the other component. In the present specification and claims, there is no difference in meaning between the words "solution", "liquid mixture", and "liquid solution". From an article by Tausz published in "Zeitschrift für angew. Chemie" June 3rd 1919 it is known to extract Edeleanu extracts with $SO_2$ and ligroin free of aromatics whereby the pure aromatics dissolve in the $SO_2$ layer and are separated from the $SO_2$ and ligroin by fractional distillation.

I claim as my invention:

1. The process for concentrating aromatic components of a hydrocarbon oil comprising extracting said oil in a first extraction zone with a selective solvent to produce a primary extract, separately extracting said primary extract in a second extraction zone with an additional quantity of a selective solvent in the presence of a hydrocarbon diluent, which may be separated by distillation from the aromatic component of said primary extract and which contains a higher concentration of non-aromatic components than said primary extract, separating the resulting secondary raffinate and extract phases, removing the diluent and the solvent from the resulting secondary extract phase, thereby producing the desired aromatic concentrate, extracting the said raffinate to recover a mixture containing aromatics and returning the last mixture to the second extraction zone.

2. The process according to claim 1 in which the secondary raffinate is extracted in the first extraction zone.

3. The process for producing a hydrocarbon mixture boiling within gasoline range and having a high aromatic content from an initial hydrocarbon mixture containing gasoline and higher boiling components, comprising extracting the said initial mixture in a first extraction zone with a selective solvent to produce primary raffinate and extract phases, separating the said phases, removing solvent therefrom and separately distilling the resulting primary raffinate and extract each into two fractions, one boiling within the gasoline range and the other boiling above gasoline range, extracting the low boiling fraction of the primary extract in a second extraction zone with an additional quantity of a selective solvent in the presence of the high boiling fraction of the primary raffinate, as diluent, to produce secondary raffinate and secondary extract phases, and removing from the secondary extract phase the solvent and the diluent to recover the hydrocarbon mixture boiling within gasoline range and having a high aromatic content.

4. The process according to claim 3 in which the secondary raffinate is returned to the first extraction zone.

HEINRICH EGLI.